(12) United States Patent
Ennis

(10) Patent No.: US 6,681,274 B2
(45) Date of Patent: Jan. 20, 2004

(54) VIRTUAL CHANNEL BUFFER BYPASS FOR AN I/O NODE OF A COMPUTER SYSTEM

(75) Inventor: Stephen C. Ennis, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 289 days.

(21) Appl. No.: 09/978,378

(22) Filed: Oct. 15, 2001

(65) Prior Publication Data

US 2003/0093593 A1 May 15, 2003

(51) Int. Cl.[7] .............................................. G06F 13/00
(52) U.S. Cl. .................. 710/52; 710/5; 710/7; 710/53; 710/56
(58) Field of Search ........................... 710/5, 7, 52, 53, 710/56

(56) References Cited

U.S. PATENT DOCUMENTS

| | | | | |
|---|---|---|---|---|
| 4,312,036 A | * | 1/1982 | Porter et al. | 364/200 |
| 5,410,305 A | * | 4/1995 | Barrus et al. | 31/22 |
| 5,751,951 A | | 5/1998 | Osborne et al. | |
| 5,809,328 A | | 9/1998 | Nogales et al. | |
| 6,278,532 B1 | | 8/2001 | Heimendinger et al. | |
| 6,414,525 B2 | | 7/2002 | Urakawa | |
| 6,414,961 B1 | | 7/2002 | Katayanagi | |
| 6,532,502 B1 | * | 3/2003 | Takaki | 710/52 |

OTHER PUBLICATIONS

U.S. patent application serial No. 09/399,281, filed Sep. 17, 1999.

* cited by examiner

Primary Examiner—Jeffrey Gaffin
Assistant Examiner—Mohammad O. Farooq
(74) Attorney, Agent, or Firm—Meyertons Hood Kivlin Kowert & Goetzel, P.C.; B. Noël Kivlin

(57) ABSTRACT

A virtual channel buffer bypass in a computer system input/output node. A control unit of an input/output node for a computer system includes a buffer circuit configured to receive control commands. The buffer circuit may include a plurality of buffers each corresponding to a respective virtual channel of a plurality of virtual channels for storing selected control commands that belong to the respective virtual channel. The buffer circuit may also be configured to determine whether each of the plurality of buffers is empty prior to storing a particular control command corresponding to a given one of the plurality of buffers. In addition, the buffer circuit may be configured to cause the particular control command to bypass the given one of the plurality of buffers in response to determining that each of the plurality of buffers is empty.

14 Claims, 7 Drawing Sheets

VIRTUAL CHANNEL BUFFER BYPASS FOR AN I/O NODE OF A COMPUTER SYSTEM

BACKGROUND OF THE INVENTION

1. Field of the Invention

This invention relates to computer system input/output (I/O) and, more particularly, to transaction handling in an I/O node.

2. Description of the Related Art

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

Unfortunately, many bus systems suffer from several drawbacks. For example, multiple devices attached to a bus may present a relatively large electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced. An example of a shared bus used by I/O devices is a peripheral component interconnect (PCI) bus.

Many I/O bridging devices use a buffering mechanism to buffer a number of pending transactions from the PCI bus to a final destination bus. However buffering may introduce stalls on the PCI bus. Stalls may be caused when a series of transactions are buffered in a queue and awaiting transmission to a destination bus and a stall occurs on the destination bus, which stops forward progress. Then a transaction that will allow those waiting transactions to complete arrives at the queue and is stored behind the other transactions. To break the stall, the transactions in the queue must somehow be reordered to allow the newly arrived transaction to be transmitted ahead of the pending transactions. Thus, to prevent scenarios such as this, the PCI bus specification prescribes a set of reordering rules that govern the handling and ordering of PCI bus transactions.

To overcome some of the drawbacks of a shared bus, some computers systems may use packet-based communications between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay or forward the packet from the source node to the target node.

Additionally, there are systems that use a combination of packet-based communications and bus-based communications. For example, a system may connect to a PCI bus and a graphics bus such as AGP. The PCI bus may be connected to a packet bus interface that may then translate PCI bus transactions into packet transactions for transmission on a packet bus. Likewise the graphics bus may be connected to an AGP interface that may translate AGP transactions into packet transactions. Each interface may communicate with a host bridge associated with one of the processors or in some cases to another peripheral device.

When PCI devices initiate the transactions, the packet-based transactions may be constrained by the same ordering rules as set forth in the PCI Local Bus specification. The same may be true for packet transactions destined for the PCI bus. These ordering rules are still observed in the packet-based transactions since transaction stalls that may occur at a packet bus interface may cause a deadlock at that packet bus interface. This deadlock may cause further stalls back into the packet bus fabric. In addition, AGP transactions may follow a set of transaction ordering rules to ensure proper delivery of data.

Depending on the configuration of the I/O nodes, transactions may be forwarded through a node to another node either in a direction to the host bridge or away from the host bridge. Alternatively, transactions may be injected into packet traffic at a particular node. In either scenario, an I/O node architecture that may control the transactions as the transactions are sent along the communication path may be desirable.

SUMMARY OF THE INVENTION

Various embodiments of a virtual channel buffer bypass in a computer system input/output node are disclosed. In one embodiment, a control unit for an input/output node of a computer system includes a buffer circuit configured to receive control commands. The buffer circuit may include a plurality of buffers each corresponding to a respective virtual channel of a plurality of virtual channels for storing selected control commands that belong to the respective virtual channel. The buffer circuit may also be configured to determine whether each of the plurality of buffers is empty prior to storing a particular control command within a given one of the plurality of buffers. In addition, the buffer circuit may be configured to cause the particular control command to bypass the given one of the plurality of buffers in response to determining that each of the plurality of buffers is empty.

In one particular implementation, the buffer circuit may be configured to cause the particular control command to be stored within the given one of the plurality of buffers in response to determining that each of the plurality of buffers is not empty In another particular implementation, the control unit may also include an arbitration unit that is coupled to the buffer circuit. The arbitration unit may be configured to determine whether storage space is available within a destination buffer. The buffer circuit may be configured to cause the particular control command to bypass the given one of the plurality of buffers in response to the arbitration unit determining that storage space is available within a destination buffer. The buffer circuit may also be configured to cause the particular control command to be stored within the given one of the plurality of buffers in response to the arbitration unit determining that storage space is not available within the destination buffer.

Figure 1:
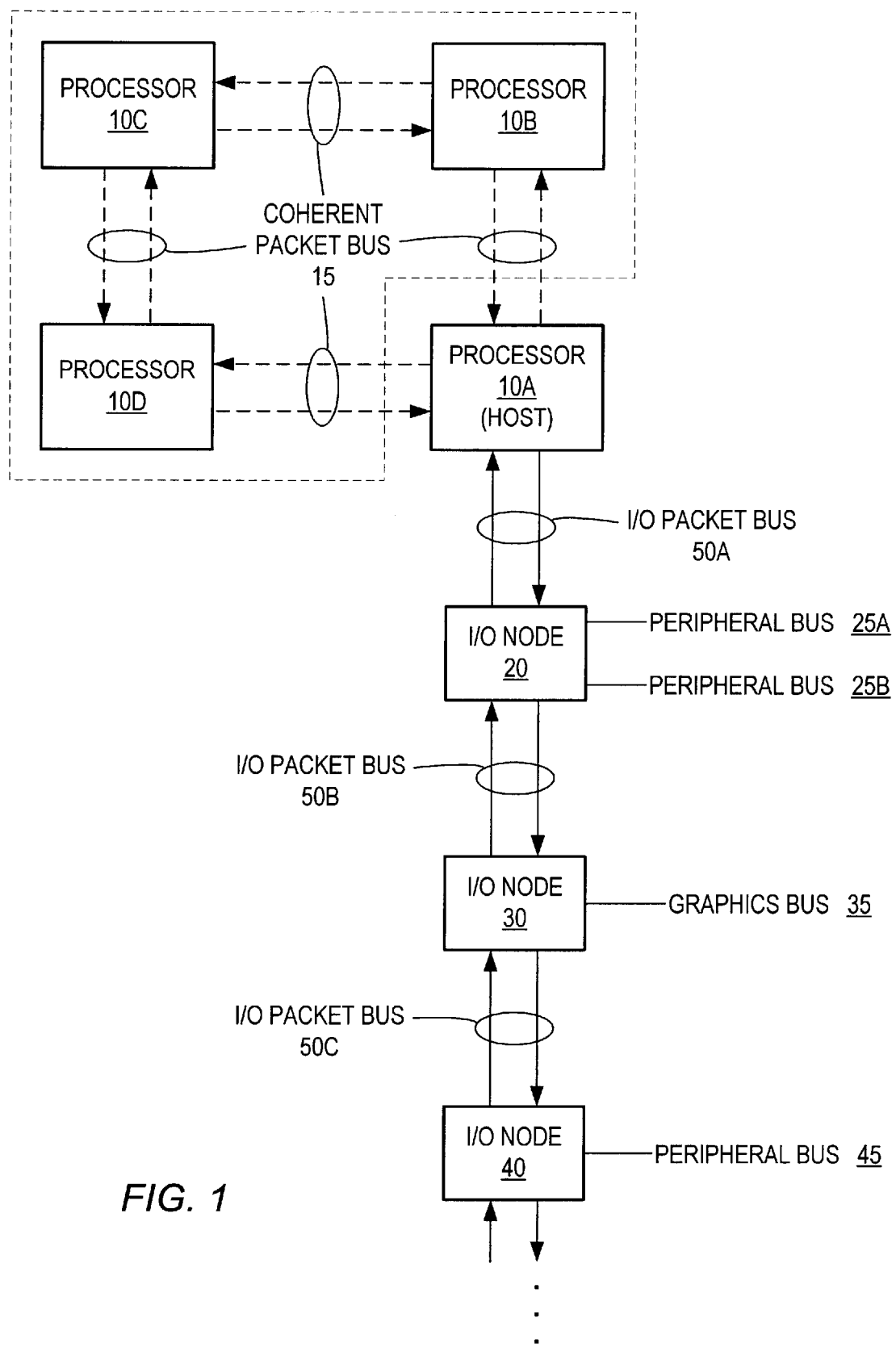
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a computer system is shown. The computer system includes processors 10A–10D each interconnected by a coherent packet bus 15. Each section of coherent packet bus 15 may form a point-to-point link between each of processors 10A–D. While four processors are shown using point-to point links it is noted that other numbers of processors may be used and other types of buses may interconnect them. The computer system also includes three I/O nodes numbered 20, 30 and 40 each connected together in a chain by I/O packet buses 50B and 50C respectively. I/O packet bus 50A is coupled between host node/processor 10A and I/O node 20. Processor 10A is illustrated as a host node which may include a host bridge for communicating with I/O packet bus 50A. Processors 10B–D may also include host bridges for communication with other I/O packet buses (not shown). The communication links formed by I/O packet bus 50A–C may also be referred to as a point-to-point links. I/O node 20 is connected to a pair of peripheral buses 25A–B. I/O node 30 is connected to a graphics bus 35, while I/O node 40 is connected to an additional peripheral bus 45.

Processors 10A–10D are each illustrative of, for example, an x86 microprocessor such as an Athlon™ microprocessor. In addition, one example of a packet bus such as I/O packet bus 50A–50C may be a non-coherent HyperTransport™. Peripheral buses 25A–B and peripheral bus 45 are illustrative of a common peripheral bus such as a peripheral component interconnect (PCI) bus. Graphics bus 35 is illustrative of an accelerated graphics port (AGP), for example. It is understood, however, that other types of microprocessors and other types of peripheral buses may be used.

It is noted that while three I/O nodes are shown connected to host processor 10A, other embodiments may have other numbers of nodes and those nodes may be connected in other topologies. The chain topology illustrated in FIG. 1 is shown for its ease of understanding.

In the illustrated embodiment, the host bridge of processor 10A may receive upstream packet transactions from downstream nodes such as I/O node 20, 30 or 40. Alternatively, the host bridge of processor 10A may transmit packets downstream to devices such as peripheral devices (not shown) that may be connected to peripheral bus 25A for example.

During operation, I/O node 20 and 40 may translate PCI bus transactions into upstream packet transactions that travel in I/O streams and additionally may translate downstream packet transactions into PCI bus transactions. All packets originating at nodes other than the host bridge of processor 10A may flow upstream to the host bridge of processor 10A before being forwarded to any other node. All packets originating at the host bridge of processor 10A may flow downstream to other nodes such as I/O node 20, 30 or 40. As used herein, "upstream" refers to packet traffic flow in the direction of the host bridge of processor 10A and "downstream" refers to packet traffic flow in the direction away from the host bridge of processor 10A. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, a peripheral device on peripheral bus 45 initiates a transaction directed to a peripheral device on peripheral bus 25. The transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. Each packet may be assigned a Unit ID that identifies the originating node. Since I/O node 20 may not forward packets to a peripheral device on peripheral bus 25 from downstream, the packets are transmitted upstream to the host bridge of processor 10A. The host bridge of processor 10A may then transmit the packets back downstream with a Unit ID of the host bridge of processor 10A until I/O node 20 recognizes and claims the packet for the peripheral device on peripheral bus 25. I/O node 20 may then translate the packets into peripheral bus transactions and transmit the transactions to the peripheral device on peripheral bus 25.

As the packet transactions travel upstream or downstream, the packets may pass through one or more I/O nodes. The pass-through is sometimes referred to as a tunnel and the I/O node is sometimes referred to as a tunnel device. Packets that are sent from upstream to downstream or from downstream to upstream are referred to as "forwarded" traffic. Additionally, packet traffic that originates at a particular I/O node and is inserted into the upstream traffic is referred to as "injected" traffic.

As will be described in greater detail below, to preserve the ordering rules of the various buses that may be connected to an I/O node, the I/O node may provide transaction reordering as well as packet buffering. The I/O node may also include control logic which controls the flow of packets into and out of the tunnel by both forwarded and injected traffic.

Figure 2:
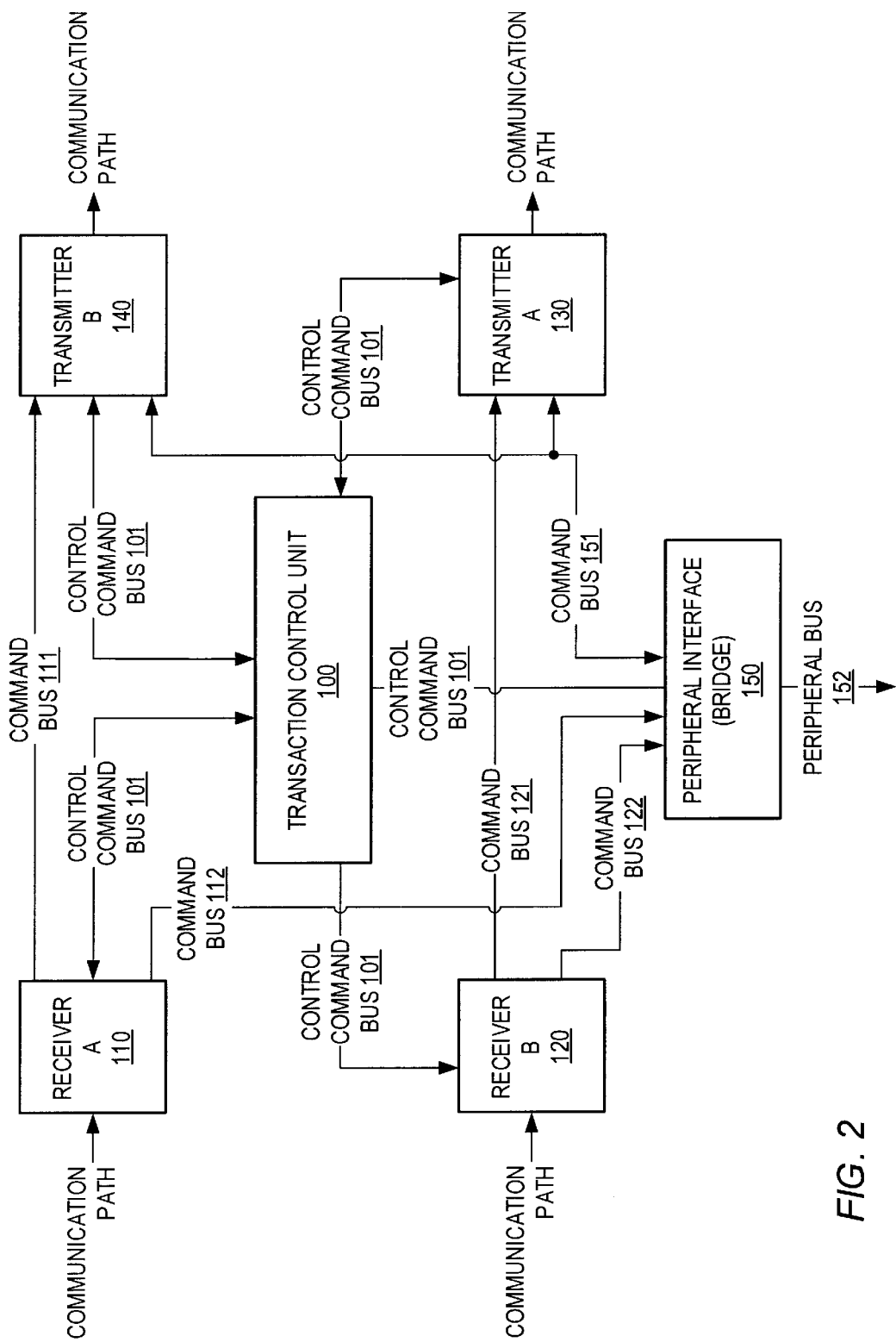
FIG. 2 is a block diagram of one embodiment of an I/O node.

Referring to FIG. 2, a block diagram of one embodiment of an I/O node is shown. The I/O node is representative of I/O node 20, 30 or 40 of FIG. 1 and will hereafter be referred to as I/O node 20 for simplicity. I/O node 20 of FIG. 2 includes a transaction receiver 110 which is coupled to a transmitter 140 via a command bus 111 and to peripheral interface 150 via a command bus 112. I/O node 20 also includes a transaction receiver 120 which is coupled to a transmitter 130 via a command bus 121 and to peripheral interface 150 via a command bus 122. Peripheral interface 150 is also coupled to transmitters 130 and 140 via a command bus 151 and to peripheral bus 152. Additionally, I/O node 20 includes a transaction control unit 100 which is coupled to each receiver, each transmitter and to peripheral interface via a control command bus 101. As used herein, a command bus is meant to include signals for command, control and data. Therefore, when a transaction or a command is said to be sent over a respective command bus it is meant to include command and data bits.

In the illustrated embodiment, receiver 110 and transmitter 140 form one communication path of the I/O tunnel and receiver 120 and transmitter 130 form a second communication path of the I/O tunnel. Since each of the communication paths is unidirectional, either path may be connected as the upstream or downstream path. Thus, the injected traffic from peripheral interface 150 is provided to either of transmitters 130 and 140.

Receivers 110 and 120 each receive packet transactions into a receive buffer (not shown). As each transaction is received, a control command is generated containing a subset of the information contained in the received command. The control command may include the Unit Id of the originating node, destination information, a data count and transaction type, for example. It is noted that the control command may include other information or may not include some of the information listed here. The control command is sent to transaction control unit 100.

In response to peripheral interface 150 receiving transactions from peripheral bus 152, peripheral interface 150 may also generate control commands containing information similar to the control command described above. Peripheral interface 150 may also store the transactions in one or more buffers and send the control commands to transaction control unit 100.

Transaction control unit 100 may store each control command that it receives into one or more buffer structures in the order that they were received. Based on the control commands that transaction control unit 100 stores in its buffers, transaction control unit 100 may decide the order that the corresponding commands waiting in source buffers (i.e. receiver and/or peripheral interface) may be sent. As will be described in greater detail below in conjunction with FIG. 3 through FIG. 6, transaction control unit 100 may arbitrate between transactions in its buffers based on such factors as the type of transaction, whether there is free buffer space at the transmitter and destination, whether the transaction is forwarded traffic or injected traffic. Thus the transaction control unit 100 may be responsible for the overall flow of transactions through the tunnel of an I/O node.

Once transaction control unit 100 arbitrates which transaction will be processed, transaction control unit 100 may direct the respective source device to send a pending transaction to the destination device. For example, the transaction control unit 100 selects a control command from its buffer that is representative of a transaction being forwarded from receiver 110 to transmitter 140. Transaction control unit 100 notifies receiver 110 to send the transaction to transmitter 140 via command bus 111. Transmitter 140 may then transmit the transaction to the next node in the chain. The next node may be another I/O node which is either upstream or downstream, or it may be a host node such as host processor 10A of FIG. 1. In addition, transaction control unit 100 and transmitter 140 may include logic (not shown) which indicates to another node whether or not there is free space in the receive buffer.

Figure 3:
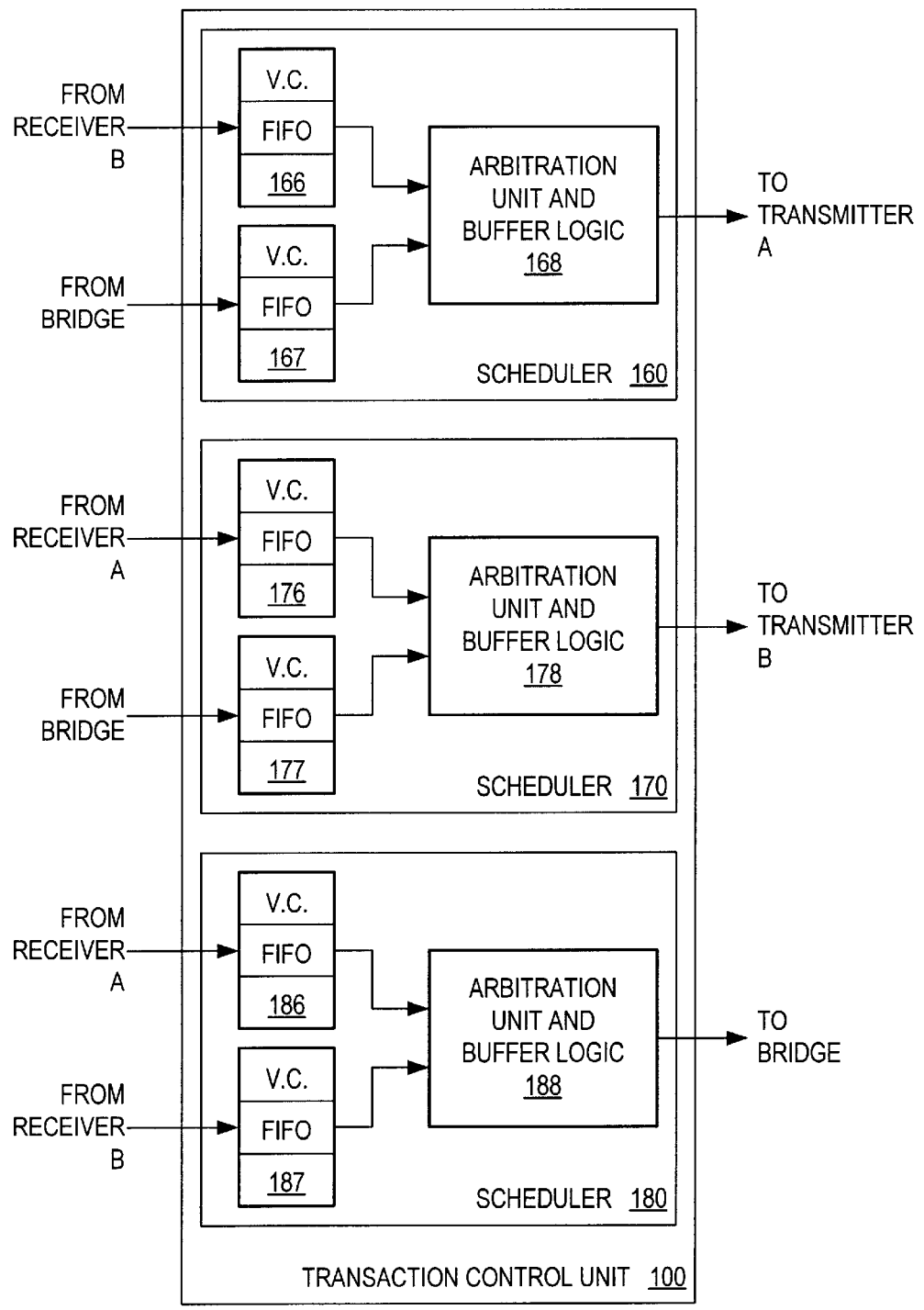
FIG. 3 is a block diagram of one embodiment of a transaction control unit.

Turning to FIG. 3, a block diagram of one embodiment of a transaction control unit is shown. Circuit components that correspond to those shown in FIG. 2 are numbered identically for simplicity and clarity. Transaction control unit 100 includes three schedulers labeled 160, 170 and 180, respectively. Each of schedulers 160, 170 and 180 include a pair of virtual channel command buffers and an arbiter and buffer management unit. The virtual channel command buffers of scheduler 160 are labeled V.C. FIFO 166 and 167 and arbiter and buffer management unit is numbered 168. Likewise, virtual channel command buffers of scheduler 170 are labeled V.C. FIFO 176 and 177 and arbiter and buffer management unit is numbered 178 and virtual channel command buffers of scheduler 180 are labeled V.C. FIFO 186 and 187 and arbiter and buffer management unit is numbered 188.

Generally speaking, a "virtual channel" is a communication path for carrying packets between various processing nodes. Each virtual channel is resource-independent of the other virtual channels (i.e. packets flowing in one virtual channel are generally not affected, in terms of physical transmission, by the presence or absence of packets in another virtual channel). Packets are assigned to a virtual channel based upon packet type. Packets in the same virtual channel may physically conflict with each other's transmission (i.e. packets in the same virtual channel may experience resource conflicts), but may not physically conflict with the transmission of packets in a different virtual channel.

Certain packets may logically conflict with other packets (i.e. for protocol reasons, coherency reasons, or other such reasons, one packet may logically conflict with another packet). If a first packet, for logical/protocol reasons, must arrive at its destination node before a second packet arrives at its destination node, it is possible that a computer system could deadlock if the second packet physically blocks the first packet's transmission (by occupying conflicting resources). By assigning the first and second packets to separate virtual channels, and by implementing the transmission medium within the computer system such that packets in separate virtual channels cannot block each other's transmission, deadlock-free operation may be achieved. It is noted that the packets from different virtual channels are transmitted over the same physical links. However, since a receiving buffer is available prior to transmission, the virtual channels do not block each other even while using this shared resource.

From one viewpoint, each different packet type (e.g. each different command encoding) could be assigned to its own virtual channel and thus in one embodiment, separate buffers are allocated to each virtual channel. Since separate buffers may be used for each virtual channel, packets from one virtual channel may not physically conflict with packets from another virtual channel (since such packets would be placed in the other buffers).

Each scheduler corresponds to a particular destination and to two sources. In the illustrated embodiment, scheduler 160 controls transactions that have transmitter 130 of FIG. 2 as a destination and receiver 120 and peripheral interface-bridge 150 as sources. Similarly, scheduler 170 of FIG. 3 controls transactions that have transmitter 140 of FIG. 2 as a destination and receiver 110 and bridge 150 as sources. Lastly, scheduler 180 of FIG. 3 controls transactions that have bridge 150 of FIG. 2 as a destination and receiver 110 and receiver 120 as sources. In FIG. 3, each virtual channel command buffer receives from a respective receiver or bridge control commands corresponding to transactions received by the respective receiver or bridge. A control command may include a destination bit designating which scheduler the control command will be sent to. Typically a control command will have only one destination bit set. However, in the event that a transaction is a broadcast message, more than one destination bit may be set to allow more than one scheduler to receive the control command.

To simplify the discussion, only scheduler 160 will be described in detail. As control commands are received into V.C. FIFO 166 or 167, they are placed into a respective FIFO section depending on the type of transaction. Since V.C. FIFO 166 and 167 are identical, only V.C. FIFO 166 will be described in detail. V.C. FIFO 166 contains three separate FIFO sections corresponding to three types of transactions: posted, non-posted and response. The control commands are placed into the respective FIFO in the order in which they were received. However, to maintain ordering rules associated with the various bus or type of device that may have generated the original command, the transactions may have to be processed out of order between different types of transactions.

As will be described in greater detail below in conjunction with FIG. 4 through FIG. 6, arbiter and buffer management logic 168 may be configured to arbitrate which transaction may be processed first, second and so on between transactions in V.C. FIFO 166 or V.C. FIFO 167. For example, a posted command which arrives in V.C. FIFO 166 before a response command may have to be processed after the response command due to the ordering rules. Additionally, arbiter and buffer management logic 168 may also arbitrate from which V.C. FIFO a transaction may be processed based on a set of fairness rules and whether or not space is available in a receive buffer of the next I/O node or the host bridge. If the destination is bridge 150 of FIG. 2, the particular arbitration rules may be different than the arbitration rules described above.

It is noted that the illustrated embodiment described above is a specific implementation of a transaction control unit. It is contemplated that alternative embodiments may include different implementations which may perform additional and/or different functions.

Figure 4:
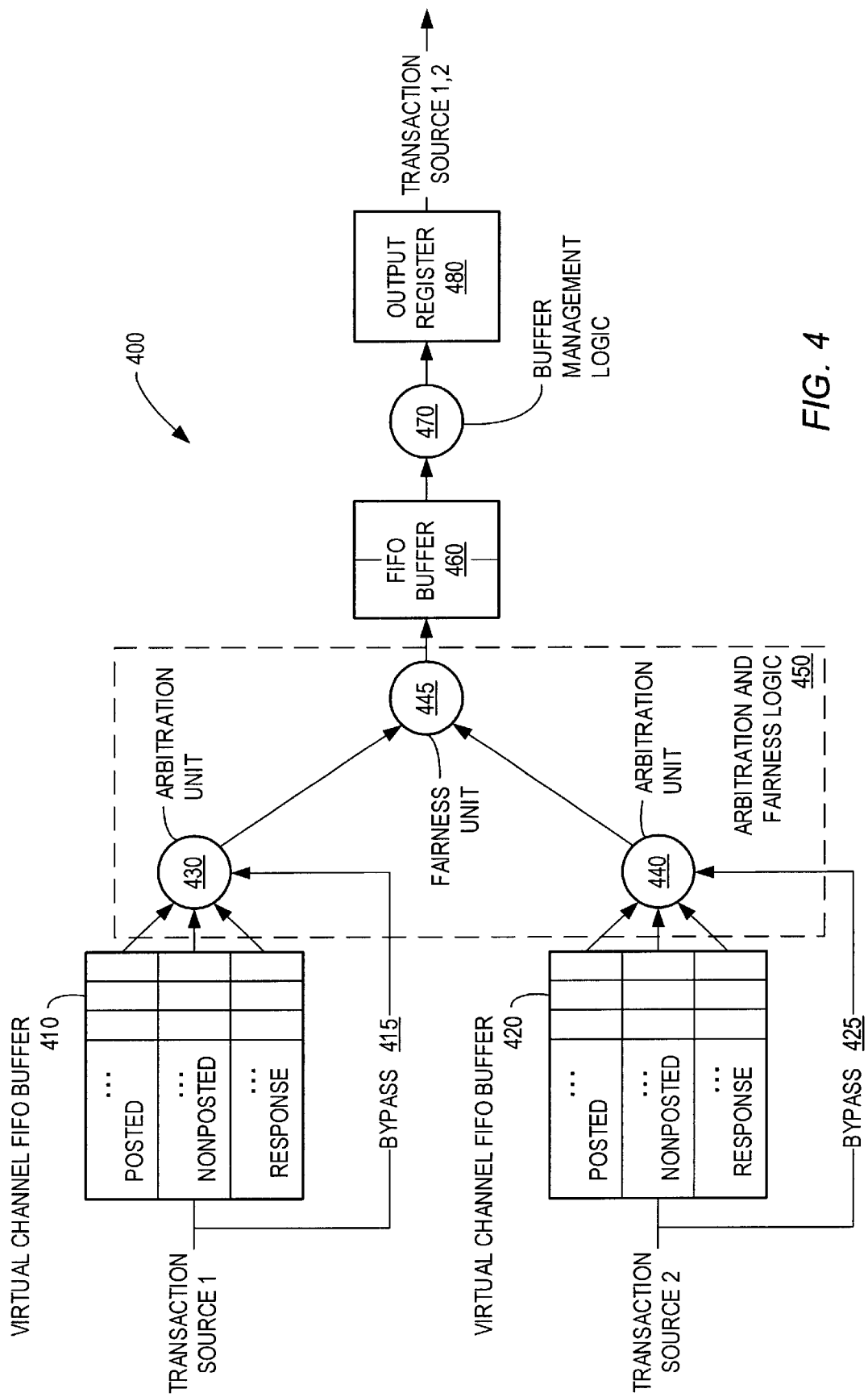
FIG. 4 is a block diagram of one embodiment of a scheduler.

Referring to FIG. 4, a block diagram of one embodiment of a scheduler is shown. Circuit components that correspond to those shown in FIG. 3 are numbered identically for simplicity and clarity. A transaction scheduler 400 includes a virtual channel FIFO buffer 410 coupled to arbitration and fairness logic 450. Transaction scheduler 400 further includes virtual channel FIFO buffer 420 which is also coupled to arbitration and fairness logic 450. Arbitration and fairness logic 450 is connected to a FIFO buffer 460, which is connected to buffer management logic 470. The output of buffer management logic is latched by output register 480.

As described above in conjunction with FIG. 3, each of virtual channel FIFO buffers 410 and 420 may receive control commands from a respective source input such as, for example, receiver 110 or bridge 150 of FIG. 2. The control commands may be placed into virtual channel FIFO buffers 410 and 420 by the type of transaction the control commands represent. Specifically, the control commands may represent either posted, non-posted or response commands and thus the respective posted, non-posted or response queue.

In the illustrated embodiment, arbitration and fairness logic 450 includes arbitration units 430 and 440, and fairness unit 445. Arbitration unit 430 may be configured to select one control command that is stored in virtual channel FIFO buffer 410. As will be described further below, the selection process may include selecting one winner by a predetermined arbitration algorithm. Likewise arbitration unit 440 may be configured to select one control command that is stored in virtual channel FIFO buffer 420 by using a similar algorithm as arbitration unit 430. Fairness unit 445 may then select one of the winning transactions selected by arbitration units 430 and 440. Fairness unit 445 may use a fairness algorithm based on whether the transaction is forwarded or injected. Depending on the destination of the scheduler, arbitration units 430 and 440 may also contain logic (not shown) which keeps track of buffer space in the corresponding transaction's destination buffer, such as a receive buffer of the next I/O node or in the host bridge of processor 10A of FIG. 1.

In the illustrated embodiment, there may be a latency of three clock cycles to propagate a control command through scheduler 400. A bypass 415 and a bypass 425 are shown to circumvent virtual channel FIFO buffer 410 and 420, respectively. When scheduler 400 receives a control command from a source and each queue within a given virtual channel FIFO buffer is empty, there may be an opportunity to save a clock cycle by bypassing the virtual channel FIFO buffer. For example, a non-posted control command is received at virtual channel FIFO buffer 410, which is currently empty. Logic within arbitration unit 430 may allow the non-posted control command to bypass virtual channel FIFO buffer 410 and be immediately placed in FIFO buffer 460 if arbitration unit 430 indicates that there is buffer space available at the transaction's destination buffer. In addition, fairness unit 445 may grant the bypass depending on the fairness algorithm as described above. Thus in the above example, a latency reduction of one clock cycle may be realized. It is noted that although the illustrated embodiment is shown to have three-clock cycle latency, it is contemplated that other embodiments may have fewer or more clock cycles of latency. Additionally, the actual latency reductions realized by bypass 415 and 425 maybe greater or smaller.

FIFO buffer 460 of FIG. 4 may receive the winning control commands. In the illustrated embodiment, FIFO buffer 460 is a two-deep buffer, however it is contemplated that in other embodiments, FIFO buffer 460 may have more or less buffer locations.

Buffer management logic 470 is configured to keep track of buffer space in transmitter 130 or 140 or in bridge 150 of FIG. 2. As transactions are stored in FIFO buffer 460, buffer management logic 470 checks the availability of the next buffer and will either hold the control command until buffer space is available or allow it to proceed to output register 480. Once the control command has been latched by output register 480, the respective transaction source is notified that the transaction corresponding to the control command may be sent to transmitter 130 or 140 or to bridge 150 of FIG. 2, respectively.

Figure 5:
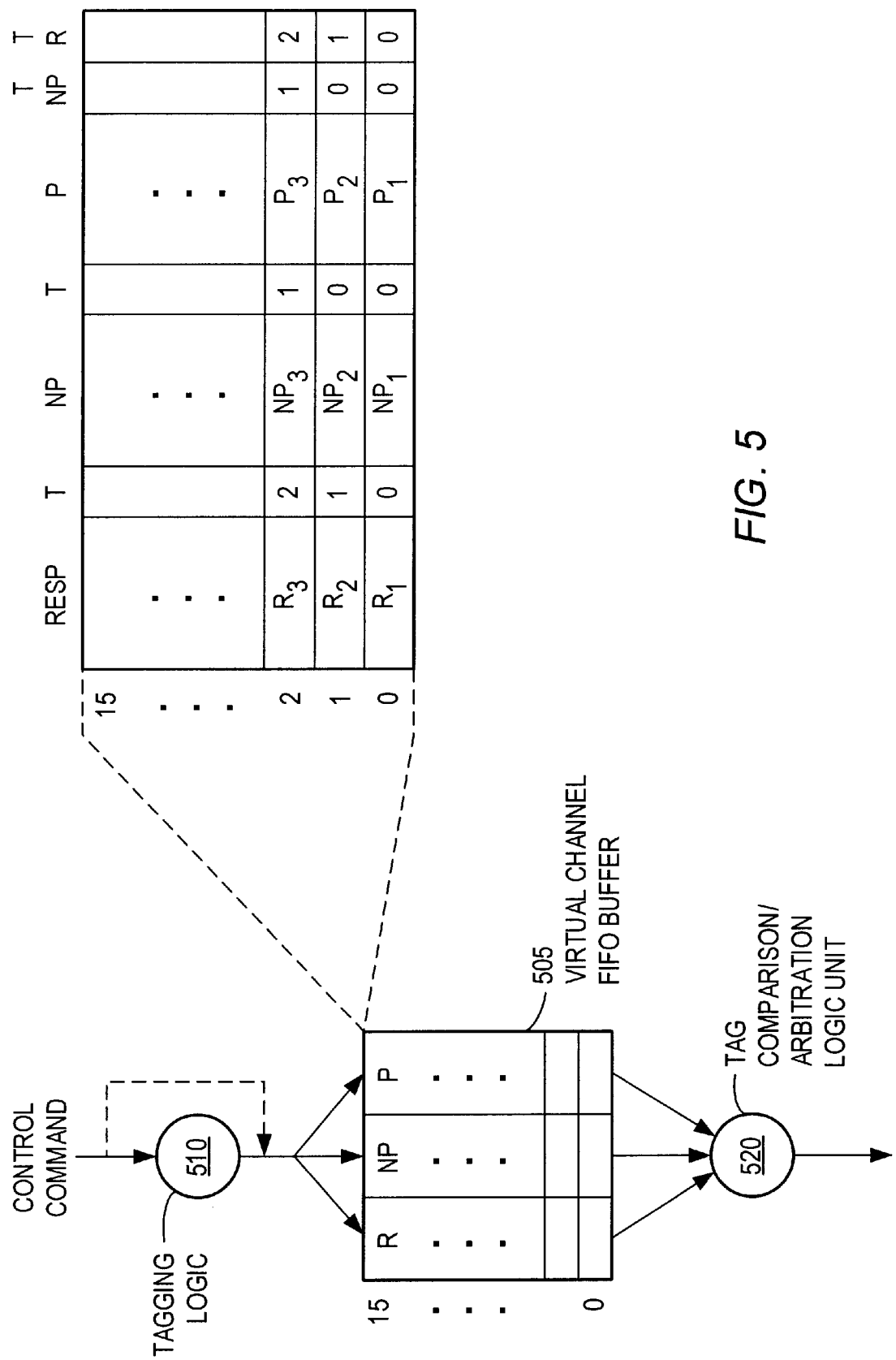
FIG. 5 is a block diagram of one embodiment of a scheduler including tagging logic.

Turning to FIG. 5, a block diagram of one embodiment of a scheduler including tagging logic is shown. Scheduler 500 includes a tagging logic 510 which is coupled to a virtual channel FIFO buffer 505. Virtual channel FIFO buffer 505 includes three separate queues corresponding to the three types of transactions: posted, non-posted and response. A tag comparison/arbitration logic unit 520 is coupled to virtual channel FIFO buffer 505. In addition an exploded view of virtual channel FIFO buffer 505 is also shown. The exploded view shows that each of the non-posted and response queues have a corresponding tag. The posted queue however, has two tags: each one corresponding to the non-posted and response queues, respectively.

Tagging logic 510 may assign a tag to each control command prior to the control command being stored in virtual channel FIFO buffer 505. Control commands may be assigned tags in the order they are received from a source unit such as receiver 110 or bridge 150 of FIG. 2. The tags may be appended to the control command.

When control commands reach the top location in virtual channel FIFO buffer 505, tag comparison/arbitration logic unit 520 may be configured to arbitrate between the three virtual channels to pick a winning control command. A winner is picked using an algorithm based on a set of ordering rules which may correspond to the ordering rules of maintained by the peripheral buses connected to the I/O node. In one embodiment the ordering rules may correspond to the PCI ordering rules. In another embodiment, the ordering rules may correspond to AGP ordering rules.

In the illustrated embodiment, the tag may be four bits since virtual channel FIFO buffer 505 maybe up to 16 locations deep. It is noted however that in other embodiments, virtual channel FIFO buffer 505 may contain other numbers of locations and thus the tag may contain a corresponding number of bits. Tagging logic 510 may include counter logic (not shown) which keeps track of the current tags for the non-posted and response control commands which have been stored in virtual channel FIFO buffer 505. The tags may be assigned according to an algorithm which increments the respective non-posted or response counters upon receipt of a posted control command if at least one blockable non-posted or response control command was received previous to the current posted control command and after a previous posted control command. As used herein, a non-posted or response control command is blockable if a special bit is set in the respective control command identifying that the non-posted or response control command may pass a posted control command in virtual channel FIFO buffer 505. In one embodiment, the special bit is referred to as a PassPW bit.

To illustrate the use of the tagging algorithm, Table 1 illustrates the receipt order and tagging of control commands entering the three posted, non-posted and response queues. The first column shows the order of receipt of the nine control commands. The second column shows the type of command received. The third column shows the tag assigned to the non-posted and response commands and the fourth and fifth commands show the non-posted and response commands counter values after they may be incremented by a posted control command. Since the posted control command receives two tags, it receives both the tags shown in the current counter values for the respective non-posted and response counters. The exploded view of virtual channel FIFO buffer 505 illustrates how the commands of Table 1 may be stored.

TABLE 1

| Receive Order | Control Command | Pass PW Bit | Tag Value | Non-Posted Counter | Response Counter |
|---|---|---|---|---|---|
| 1 | Posted 1 | 0 | | 0 | 0 |
| 2 | Response 1 | 0 | 0 | 0 | 0 |
| 3 | Posted 2 | 0 | | 0 | 1 |
| 4 | Non-Posted 1 | 0 | 0 | 0 | 1 |
| 5 | Response 2 | 0 | 1 | 0 | 1 |
| 6 | Non-Posted 2 | 0 | 0 | 0 | 1 |
| 7 | Posted 3 | 0 | | 1 | 2 |
| 8 | Response 3 | 0 | 2 | 1 | 2 |
| 9 | Non-Posted 3 | 0 | 1 | 1 | 2 |

Table 2 illustrates how the PassPW bit may affect the tagging of the received control commands shown in Table 1. If the PassPW bit is set for a non-posted or response control command, the next posted control command will not increment the respective counter. For example, in Table 2, the PassPW bit is set for Response 1, thus when Posted 2 control command is received, the response counter is not incremented. However, the PassPW bit is set for Non-posted 2, and the Posted 3 control command causes both the non-posted and response counters to increment. This is because the Non-posted 1 control command was received with the PassPW bit clear after the last posted control command and before the current posted control command, thus satisfying the tagging rules for incrementing the counter. It is noted that although the PassPW bit is described as set to indicate that a non-posted or response control command may pass a posted control command, it is contemplated that in other embodiments the logic may be reversed.

TABLE 2

| Receive Order | Control Command | Pass PW Bit | Tag Value | Non-Posted Counter | Response Counter |
|---|---|---|---|---|---|
| 1 | Posted 1 | 0 | | 0 | 0 |
| 2 | Response 1 | 1 | 0 | 0 | 0 |
| 3 | Posted 2 | 0 | | 0 | 0 |
| 4 | Non-Posted 1 | 0 | 0 | 0 | 0 |
| 5 | Response 2 | 0 | 0 | 0 | 0 |
| 6 | Non-Posted 2 | 1 | 0 | 0 | 0 |
| 7 | Posted 3 | 0 | | 1 | 1 |
| 8 | Response 3 | 0 | 1 | 1 | 1 |
| 9 | Non-Posted 3 | 0 | 1 | 1 | 1 |

Referring back to FIG. 5, during arbitration, tag comparison and arbitration logic unit 520 is configured to pick a winning control command from virtual channel FIFO buffer 505 by comparing the tags appended to each control command. Additionally, prior to the tag comparison, tag comparison and arbitration logic unit 520 may identify whether or not there is buffer space available at the next I/O node for each of the virtual channels. If any virtual channel is blocked, then that channel does not participate in the arbitration for that cycle. If all three channels are open for arbitration, then the arbitration takes place between the non-posted and response channels in a round robin fashion and the posted channel is compared to the non-posted and response channels individually. Lastly, tag comparison and arbitration logic unit 520 may use a fairness algorithm in deciding a winner. The fairness algorithm will be described in greater detail below in conjunction with the description of FIG. 6.

Figure 6:
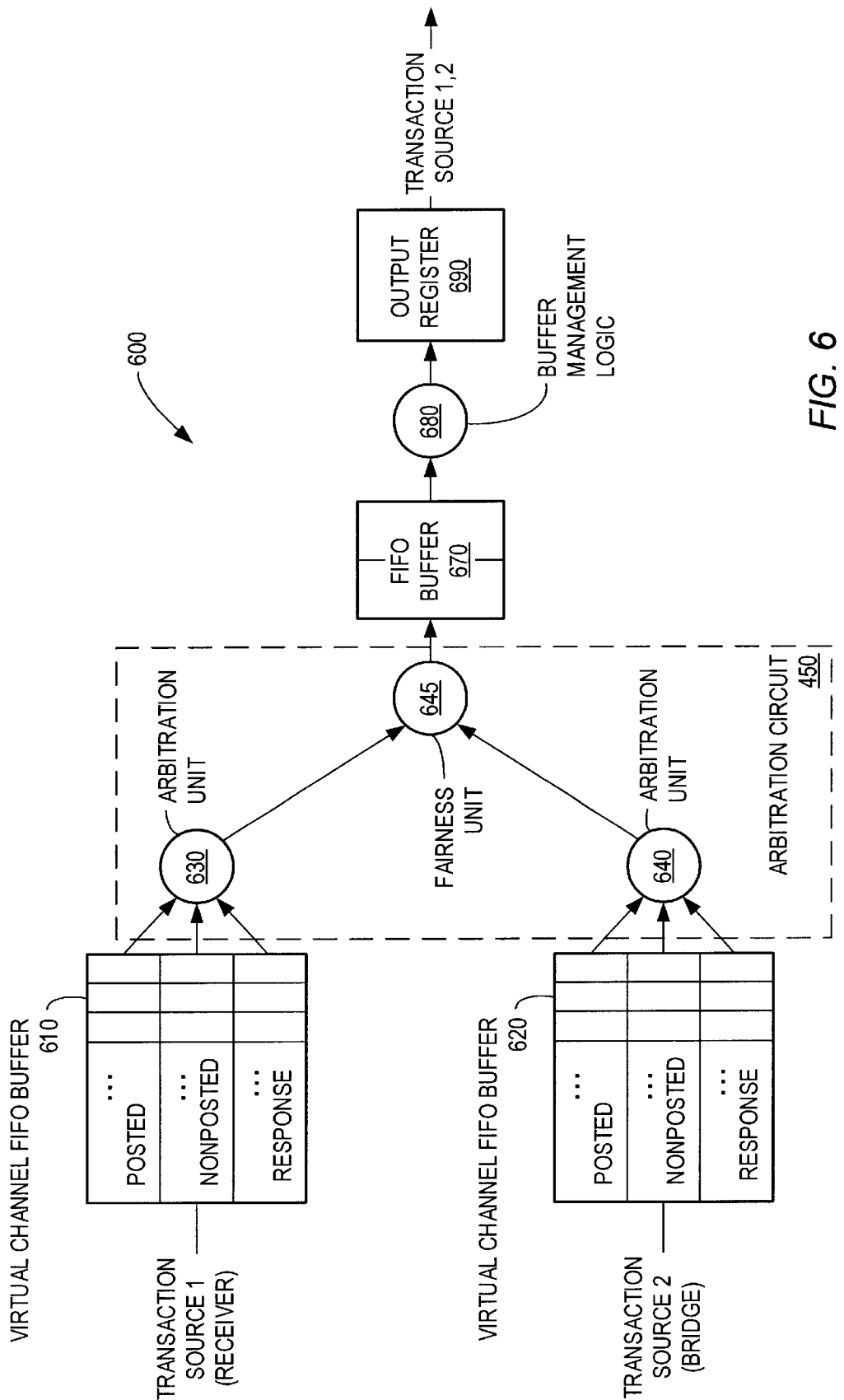
FIG. 6 is a block diagram of one embodiment of a transaction scheduler including starvation avoidance logic.

Referring now to FIG. 6, a block diagram of one embodiment of a transaction scheduler including starvation avoidance logic is shown. A transaction scheduler 600 includes a virtual channel FIFO buffer 610 coupled to an arbitration circuit 650. Transaction scheduler 600 further includes virtual channel FIFO buffer 620 which is also coupled to arbitration circuit 650. Arbitration circuit 650 is connected to a FIFO buffer 670, which is connected to buffer management logic 680. The output of buffer management logic is latched by output register 690.

Similar to the descriptions of FIG. 3 and FIG. 4 above, each of virtual channel FIFO buffers 610 and 620 may receive control commands from a respective source input such as, for example, receiver 110 or bridge 150 of FIG. 2. The control commands may be stored in virtual channel FIFO buffers 610 and 620 according to the type of transaction the control commands represent. For example, the control commands may represent posted, non-posted or response commands and thus may be stored in the respective posted, non-posted or response queue.

In the illustrated embodiment, arbitration circuit 650 includes arbitration units 630 and 640, and fairness circuit 645. During an arbitration cycle, arbitration units 630 and 640 may be configured to select a control command stored within virtual channel FIFO buffers 610 and 620, respectively. In addition, fairness circuit 645 may provide selection conditions which may determine which of arbitration units 630 or 640 will select the winning transaction. As will be described in greater detail below in conjunction with the description of FIG. 7, fairness circuit 645 may use a fairness algorithm to establish arbitration priorities to distribute bandwidth. The fairness algorithm may depend upon starvation avoidance logic determining when any transaction has been blocked for a predetermined number of arbitration cycles.

Figure 7:
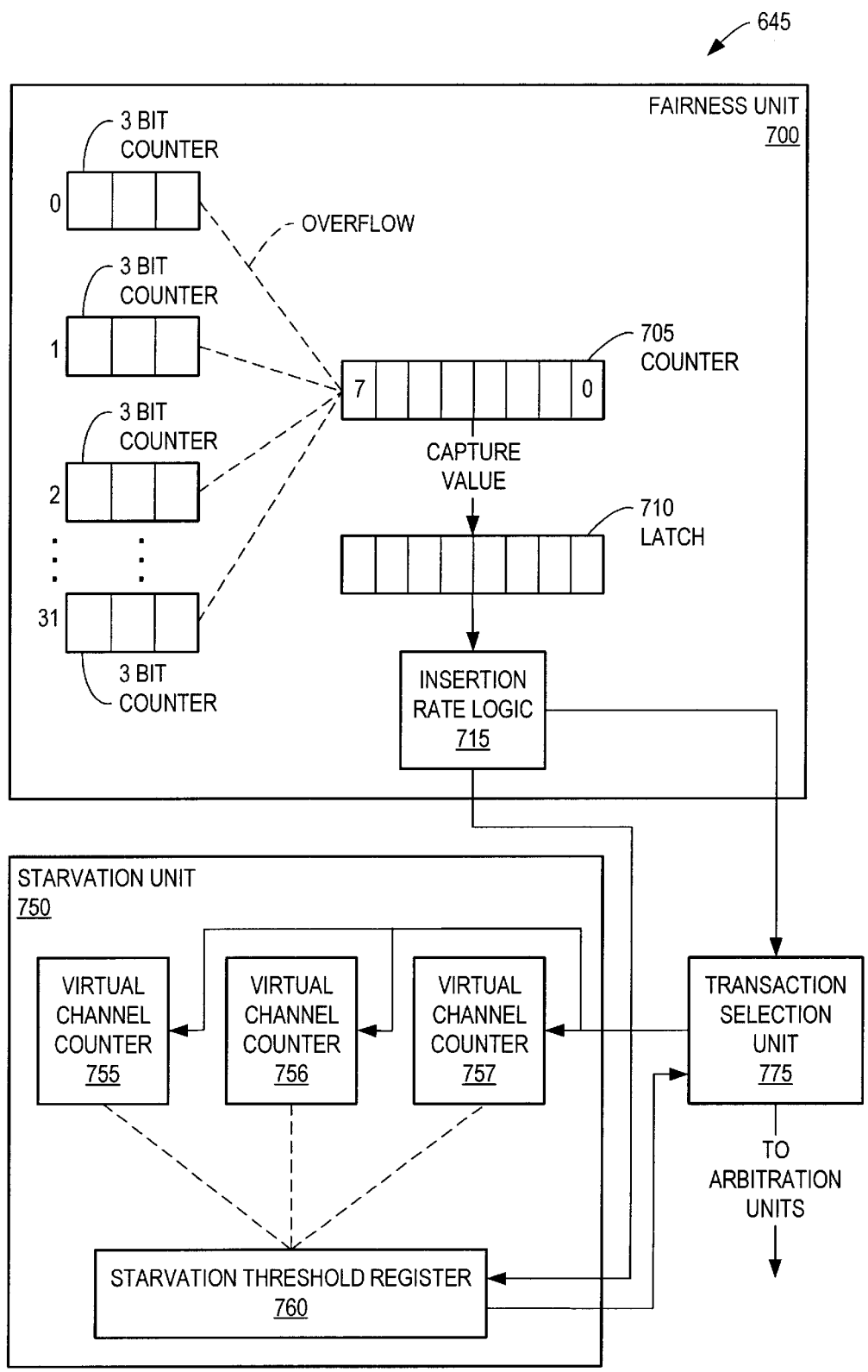
FIG. 7 is a block diagram of one embodiment of a fairness circuit.

Turning to FIG. 7, a block diagram of one embodiment of the fairness circuit of FIG. 6 is shown. Fairness circuit 645 includes a fairness unit 700 including thirty-two 3-bit counters 0–31 which are coupled to an 8-bit counter 705. A latch 710 is coupled counter 705. Insertion rate logic 715 is coupled to latch 710. Fairness circuit 645 also includes a starvation unit 750 which includes three virtual channel counters 755–757 coupled to a starvation threshold register 760 and a transaction selection unit 775 coupled to fairness unit 700 and starvation unit 750.

In one embodiment, each time a transaction is forwarded through the tunnel, the 3-bit counter 1–31 corresponding to the I/O node that sent the transaction may be incremented. Additionally, counter 705 may be incremented each time any of the 3-bit counters 0–31 are incremented. When one of the 3-bit counters 0–31 overflows, the value in counter 705 may be captured by latch 710. The captured value may represent the downstream node transaction request rate at that particular point in time. Insertion rate logic 715 may then calculate the allowable insertion rate for that node using the captured value.

Transaction selection unit 775 may cause a pointer in arbitration unit 630 or 640 of FIG. 6 to point to the virtual channel buffer being considered during an arbitration cycle. There may be times when there are transactions in a virtual channel of a forwarded virtual channel buffer and transactions in the same virtual channel of an inserted buffer. In FIG. 7, transaction selection unit 775 may alternately select the two virtual channel buffers according to the priorities established by fairness unit 700. However in the event that a virtual channel becomes blocked by such factors as lack of available buffer space at a transaction's destination, arbitration logic may skip the blocked channel and go to the next virtual channel while arbitration continues. When the blocked channel becomes available, there may only be space available for the forwarded channel and since it may have priority over the inserted channel according to the fairness algorithm, the transaction from the forwarded channel may be sent. Then the next time the previously blocked channel becomes available, it may again not have the priority in the current arbitration cycle and thus would be skipped again. This condition may persist and therefore "starve" the inserted virtual channel. Depending upon the configuration of a particular node, it is contemplated that in other embodiments, the forwarded channel may also become starved by an injected channel by similar events.

To avoid starving a given channel, starvation unit 750 may keep track of the number of times a transaction is blocked. Each time transaction selection unit 775 determines which transaction is eligible for arbitration but is blocked, transaction selection unit 775 causes the corresponding virtual channel counter 755–757 to increment. Starvation threshold register 760 holds a value corresponding to the maximum number of times a channel may be skipped during arbitration. The value stored in starvation threshold register 760 may be dynamically changed depending on the calculated request rate at any given time. When any of the virtual channel counters 755–757 match the value in starvation threshold register, the priority of the corresponding virtual channel may be changed so that transaction selection unit 775 may cause the blocked transaction to be selected during a subsequent arbitration cycle. Thus, by dynamically changing the priority, starvation of a particular channel may be avoided. It is noted that the logic arrangement described is but one specific implementation. It is contemplated that alternative embodiments may use alternative logic arrangements including different numbers of counters and more or less bits in those counters to achieve the functionality described above.

Numerous variations and modifications will become apparent to those skilled in the art once the above disclosure is fully appreciated. It is intended that the following claims be interpreted to embrace all such variations and modifications.

What is claimed is:

1. A control unit for an input/output node of a computer system comprising:

a buffer circuit configured to receive control commands, wherein said buffer circuit includes a plurality of buffers each corresponding to a respective virtual channel of a plurality of virtual channels for storing selected control commands that belong to said respective virtual channel;

wherein said buffer circuit is configured to determine whether each of said plurality of buffers is empty prior to storing a particular control command within a given one of said plurality of buffers; and wherein said buffer circuit is further configured to cause said particular control command to bypass said given one of said plurality of buffers in response to determining that each said plurality of buffers is empty.

2. The control unit as recited in claim 1, wherein said buffer circuit is further configured to cause said particular control command to be stored within said given one of said plurality of buffers in response to determining that each of said plurality of buffers is not empty.

3. The control unit as recited in claim 1 further comprising an arbitration unit coupled to said buffer circuit and configured to determine whether storage space is available within a destination buffer.

4. The control unit as recited in claim 3, wherein said buffer circuit is further configured to cause said particular control command to bypass said given one of said plurality of buffers in response to said arbitration unit determining that storage space is available within a destination buffer.

5. The control unit as recited in claim 4, wherein said buffer circuit is further configured to cause said particular control command to be stored within said given one of said plurality of buffers in response to said arbitration unit determining that storage space is not available within a destination buffer.

6. The control unit as recited in claim 1, wherein each of said plurality of buffers is a FIFO buffer structure including a plurality of storage locations.

7. The control unit as recited in claim 1, wherein said plurality of virtual channels includes a posted channel, a non-posted channel and a response channel.

8. An input/output node for a computer system comprising:

a first source unit;

a second source unit; and a control unit coupled to said first source unit and said second source unit, said control unit including:

a buffer circuit configured to receive control commands, wherein said buffer circuit includes a plurality of buffers each corresponding to a respective virtual channel of a plurality of virtual channels for storing selected control commands that belong to said respective virtual channel;

wherein said buffer circuit is configured to determine whether each of said plurality of buffers is empty prior to storing a particular control command within a given one of said plurality of buffers; and wherein said buffer circuit is further configured to cause said particular control command to bypass said given one of said plurality of buffers in response to determining that each of said plurality of buffers is empty.

9. The input/output node as recited in claim 8, wherein said buffer circuit is further configured to cause said particular control command to be stored within said given one of said plurality of buffers in response to determining that each of said plurality of buffers is not empty.

10. The input/output node as recited in claim 9 further comprising an arbitration unit coupled to said buffer circuit and configured to determine whether storage space is available within a destination buffer.

11. The input/output node as recited in claim 10, wherein said buffer circuit is further configured to cause said particular control command to bypass said given one of said plurality of buffers in response to said arbitration unit determining that storage space is available within a destination buffer.

12. The input/output node as recited in claim 11, wherein said buffer circuit is further configured to cause said particular control command to be stored within said given one of said plurality of buffers in response to said arbitration unit determining that storage space is not available within a destination buffer.

13. The input/output node as recited in claim 8, wherein each of said plurality of buffers is a FIFO buffer structure including a plurality of storage locations.

14. The input/output node as recited in claim 8, wherein said plurality of virtual channels includes a posted channel, a non-posted channel and a response channel.

* * * * *